United States Patent
Deogun et al.

(10) Patent No.: US 12,279,306 B2
(45) Date of Patent: *Apr. 15, 2025

(54) RANDOM ACCESS CHANNEL ACCESS AND VALIDITY PROCEDURES

(71) Applicant: QUALCOMM Incorporated, San Diego, CA (US)

(72) Inventors: Pravjyot Singh Deogun, Bengaluru (IN); Xiaoxia Zhang, San Diego, CA (US); Ozcan Ozturk, San Diego, CA (US); Jing Sun, San Diego, CA (US); Kapil Bhattad, Bangalore (IN); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,374

(22) Filed: Nov. 9, 2020

(65) Prior Publication Data

US 2021/0058976 A1 Feb. 25, 2021

Related U.S. Application Data

(63) Continuation of application No. 16/790,623, filed on Feb. 13, 2020, now Pat. No. 10,869,336.

(30) Foreign Application Priority Data

Feb. 15, 2019 (IN) .............................. 201941006033

(51) Int. Cl.
H04W 74/08 (2009.01)
H04L 5/00 (2006.01)
(Continued)

(52) U.S. Cl.
CPC ....... *H04W 74/0808* (2013.01); *H04L 5/0048* (2013.01); *H04W 8/005* (2013.01);
(Continued)

(58) Field of Classification Search
None
See application file for complete search history.

(56) References Cited

U.S. PATENT DOCUMENTS

| 9,860,678 B2 | 1/2018 | Oh |
| 10,034,305 B2 | 7/2018 | Uziel et al. |

(Continued)

FOREIGN PATENT DOCUMENTS

| EP | 3054737 A1 | 8/2016 |
| EP | 3407662 A1 | 11/2018 |
| WO | WO-2018232123 A1 | 12/2018 |

OTHER PUBLICATIONS

International Search Report and Written Opinion—PCT/US2020/018301—ISAEPO—dated May 14, 2020.
(Continued)

*Primary Examiner* — Steven Hieu D Nguyen
(74) *Attorney, Agent, or Firm* — Norton Rose Fulbright US LLP

(57) ABSTRACT

Random access channel access and validity procedures are disclosed. In one aspect, the medium access control (MAC) indications multiple random access occasions (ROs) to user equipments (UEs) for random access transmissions. In such aspect, random access failure would only be declared if listen before talk (LBT) procedures for the random access transmission fail on all of the ROs indicated by the MAC layer. Similarly, in additional aspects, a UE will not apply a backoff value for any LBT failures for random access attempts that occur within an LBT time window. In further aspects, a UE may determine the validity of ROs that (Continued)

overlap with a discovery reference signal measurement timing configuration (DMTC) window. In such aspects, the UE may not use overlapping ROs or may determine a portion of the DMTC window that is not used for base station transmissions and declare the overlapping ROs with the unused portion valid.

24 Claims, 16 Drawing Sheets

(51) Int. Cl.
    *H04W 8/00*      (2009.01)
    *H04W 56/00*     (2009.01)
    *H04W 74/0808*   (2024.01)
    *H04W 74/0833*   (2024.01)
    *H04W 80/02*     (2009.01)

(52) U.S. Cl.
    CPC ..... *H04W 56/001* (2013.01); *H04W 74/0833* (2013.01); *H04W 80/02* (2013.01)

(56) References Cited

U.S. PATENT DOCUMENTS

| | | | |
|---|---|---|---|
| 10,136,452 B2 | 11/2018 | Liu et al. | |
| 10,187,907 B2* | 1/2019 | Dinan | H04W 74/0833 |
| 10,201,016 B2 | 2/2019 | Dabeer et al. | |
| 10,278,215 B2 | 4/2019 | Pal | |
| 10,306,590 B2 | 5/2019 | Patel et al. | |
| 10,368,372 B2 | 7/2019 | Chendamarai Kannan et al. | |
| 10,594,653 B2 | 3/2020 | Bhushan et al. | |
| 10,681,738 B2* | 6/2020 | Babaei | H04W 74/0833 |
| 10,720,980 B2 | 7/2020 | Sun et al. | |
| 10,869,336 B2* | 12/2020 | Deogun | H04W 80/02 |
| 2008/0168114 A1 | 7/2008 | Han et al. | |
| 2009/0109838 A1* | 4/2009 | Kuo | H04W 76/18 370/216 |
| 2013/0003700 A1* | 1/2013 | Zhang | H04W 76/19 370/328 |
| 2017/0006599 A1* | 1/2017 | Dinan | H04L 27/26 |
| 2017/0006640 A1* | 1/2017 | Dinan | H04W 74/0833 |
| 2017/0006641 A1* | 1/2017 | Dinan | H04W 74/0833 |
| 2017/0195889 A1* | 7/2017 | Takeda | H04W 72/0446 |
| 2017/0265225 A1* | 9/2017 | Takeda | H04W 16/32 |
| 2017/0310434 A1* | 10/2017 | Harada | H04L 27/0006 |
| 2018/0092064 A1 | 3/2018 | Ryu et al. | |
| 2018/0115975 A1* | 4/2018 | Takeda | H04J 3/00 |
| 2018/0124612 A1* | 5/2018 | Babaei | H04W 72/23 |
| 2018/0124825 A1* | 5/2018 | Lee | H04W 74/006 |
| 2018/0302913 A1 | 10/2018 | Yin et al. | |
| 2018/0368205 A1* | 12/2018 | Park | H04W 76/34 |
| 2019/0037603 A1 | 1/2019 | Damnjanovic et al. | |
| 2019/0044782 A1 | 2/2019 | Zeng et al. | |
| 2019/0045458 A1* | 2/2019 | Harada | H04W 72/54 |
| 2019/0150201 A1 | 5/2019 | Dinan | |
| 2019/0246425 A1 | 8/2019 | Zhang et al. | |
| 2020/0100295 A1 | 3/2020 | Pao et al. | |
| 2020/0107373 A1* | 4/2020 | Roy | H04L 43/18 |
| 2020/0112996 A1* | 4/2020 | Pan | H04W 72/0453 |
| 2020/0221495 A1* | 7/2020 | Chen | H04W 36/00835 |
| 2020/0267763 A1 | 8/2020 | Deogun | |
| 2021/0076416 A1* | 3/2021 | Shah | H04W 74/006 |
| 2022/0039016 A1* | 2/2022 | Terry | H04W 52/0235 |
| 2022/0070930 A1* | 3/2022 | Xiong | H04W 74/0891 |

OTHER PUBLICATIONS

Mediatek Inc: "Handling Systematic LBT Failures in Random Access", 3GPP Draft, 3GPP TSG-RAN WG2 Meeting #104, R2-1816684 Handling Systematic LBT Failures in Random Access, 3rd Generation Partnership Project (3GPP), Mobile Competence Centre, 650, Route Des Lucioles, F-06921 Sophia-Antipolis Cedex, vol. RAN WG2, No. Spokane, US, 20181112-20181116, Nov. 12, 2018 (Nov. 12, 2018), XP051556253, 4 Pages, Retrieved from the Internet: URL: http://www.3gpp.org/ftp/Meetings%5F3GPP%5FSYNC/RAN2/Docs/R2%2D1816684%2Ezip, [retrieved on Nov. 12, 2018], p. 1-p. 3, figures 1-3, p. 2, line 16-line 17, "Observation 2", p. 2, p. 3, line 8-line 9 "Proposal 2", p. 3.

ZTE: "Considerations on 4-step RACH Procedure for NR-U", 3GPP Draft, 3GPP TSG RAN WG2 NR #104 Meeting, R2-1816829, Considerations on 4-step RACH procedure for NR-U, 3rd Generation Partnership Project (3GPP), Mobile Competence Centre, 650, Route Des Lucioles, F-06921 Sophia-Antipolis Cedex, vol. RAN WG2, No. Spokane, US, 20181112-20181116, Nov. 12, 2018 (Nov. 12, 2018), XP051556393, 6 Pages, Retrieved from the Internet: URL: http://www.3gpp.org/ftp/Meetings%5F3GPP%5FSYNC/RAN2/Docs/R2%2D1816829%2Ezip, [retrieved on Nov. 12, 2018], p. 3, line 1, paragraph 2.2—line 9, p. 4, line 10-line 17.

European Search Report—EP23210968—Search Authority—The Hague—Jan. 23, 2024.

* cited by examiner

RANDOM ACCESS CHANNEL ACCESS AND VALIDITY PROCEDURES

CROSS-REFERENCE TO RELATED APPLICATIONS

This application is a continuation of U.S. patent application Ser. No. 16/790,623, entitled, "RANDOM ACCESS CHANNEL ACCESS AND VALIDITY PROCEDURES," filed Feb. 13, 2020, and claims the benefit of Indian Provisional Patent Application No. 201941006033, entitled, "RACH CHANNEL ACCESS AND VALIDITY PROCEDURES," filed on Feb. 15, 2019, which is expressly incorporated by reference herein in its entirety.

BACKGROUND

Field

Aspects of the present disclosure relate generally to wireless communication systems, and more particularly, to random access channel access and validity procedures.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes obtaining, by a user equipment (UE), a random access indication identifying one or more random access occasions, performing, by the UE, a listen before talk (LBT) procedure prior to at least one of the one or more random access occasions, and determining, by the UE, a random access failure based on a set of consecutive LBT failures over a predetermined window at consecutive random access occasions of the one or more random access occasions.

In an additional aspect of the disclosure, an apparatus configured for wireless communications includes means for obtaining, by a UE, a random access indication identifying one or more random access occasions, means for performing, by the UE, an LBT procedure prior to at least one of the one or more random access occasions, and means for determining, by the UE, a random access failure based on a set of consecutive LBT failures over a predetermined window at consecutive random access occasions of the one or more random access occasions.

In an additional aspect of the disclosure, a non-transitory computer-readable medium having program code recorded thereon. The program code further includes code to obtain, by a UE, a random access indication identifying one or more random access occasions, code to perform, by the UE, an LBT procedure prior to at least one of the one or more random access occasions, and code to determine, by the UE, a random access failure based on a set of consecutive LBT failures over a predetermined window at consecutive random access occasions of the one or more random access occasions.

In an additional aspect of the disclosure, an apparatus configured for wireless communication is disclosed. The apparatus includes at least one processor, and a memory coupled to the processor. The processor is configured to obtain, by a UE, a random access indication identifying one or more random access occasions, to perform, by the UE, an LBT procedure prior to at least one of the one or more random access occasions, and to determine, by the UE, a random access failure based on a set of consecutive LBT failures over a predetermined window at consecutive random access occasions of the one or more random access occasions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
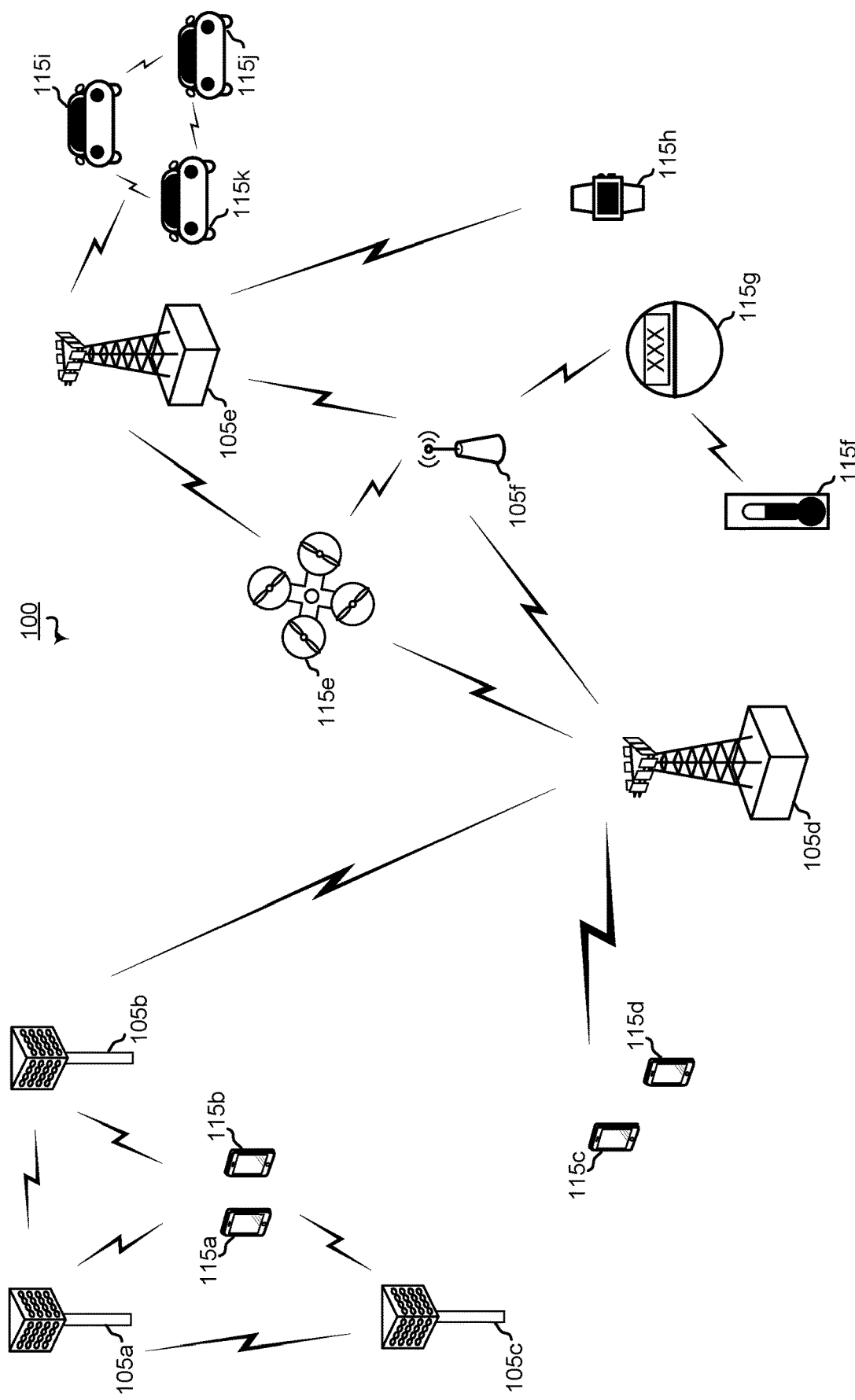
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
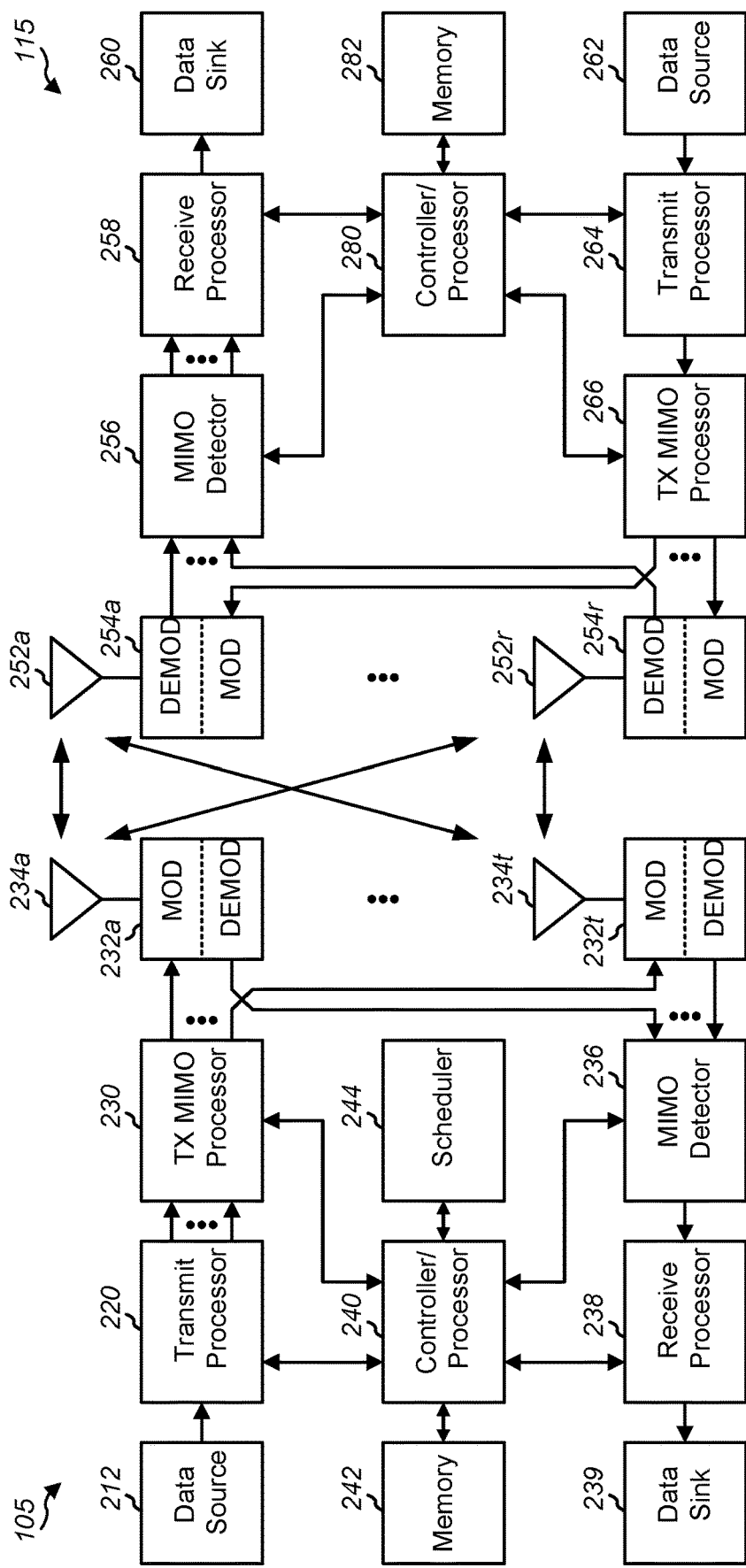
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 4, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
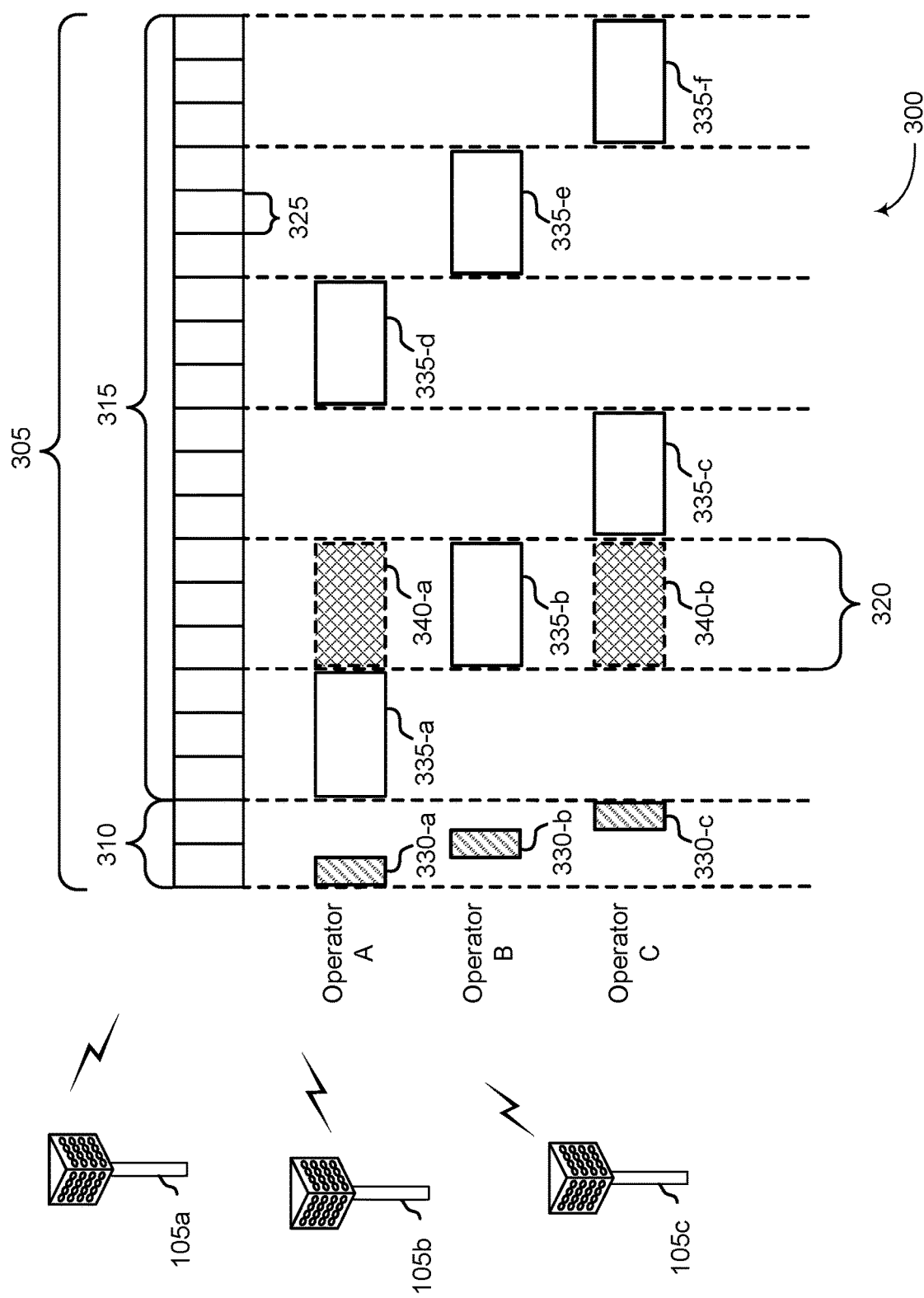
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as the 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Failure to acquire the channel has been one of the issues of using unlicensed channels for communications due to the uncertainty of winning access to the communication spectrum with listen before talk (LBT) procedures. The effect of this failure to acquire the channel is also seen in the connection establishment procedure of a cell. Random access procedures can have frequent LBT failures, which may lead to increased delay and increased interference caused in the unlicensed channel due to random access retransmissions. Various aspects of the present disclosure provide for making random access procedures more robust in the presence of consistent LBT failures and to define robust rules for random access transmission validity over unlicensed channels.

Repeated LBT failures in preparation for random access transmissions has been considered to result in a declared random access failure. When random access failures occur, a UE may increase transmission power for subsequent random access attempts. When such random access attempts continue to fail at a consistent rate, radio link failure (RLF) may result for a given UE. In an NR-U network, LBT failures may occur in burst due to acquisition of the shared channel by an interfering node. For example, when the interfering node acquires a channel over a channel occupancy time (COT) (e.g., 8 ms, 10 ms, etc.), all random access attempts by the UE will fail during the COT of the interfering node. However, after this burst of LBT failures over the interfering COT, the UE may again have access to attempt random access transmissions in subsequent random access occasions (ROs). Burst LBT failures should not be treated as independent random access failures because such failure does not accurately reflect congestion in the channel. Thus, RLF may be declared much earlier and in an environment that does not necessarily warrant such declaration. Various aspects of the present disclosure may provide a procedure for declaring random access failure that may more accurately reflect congestion in the channel.

Figure 4:
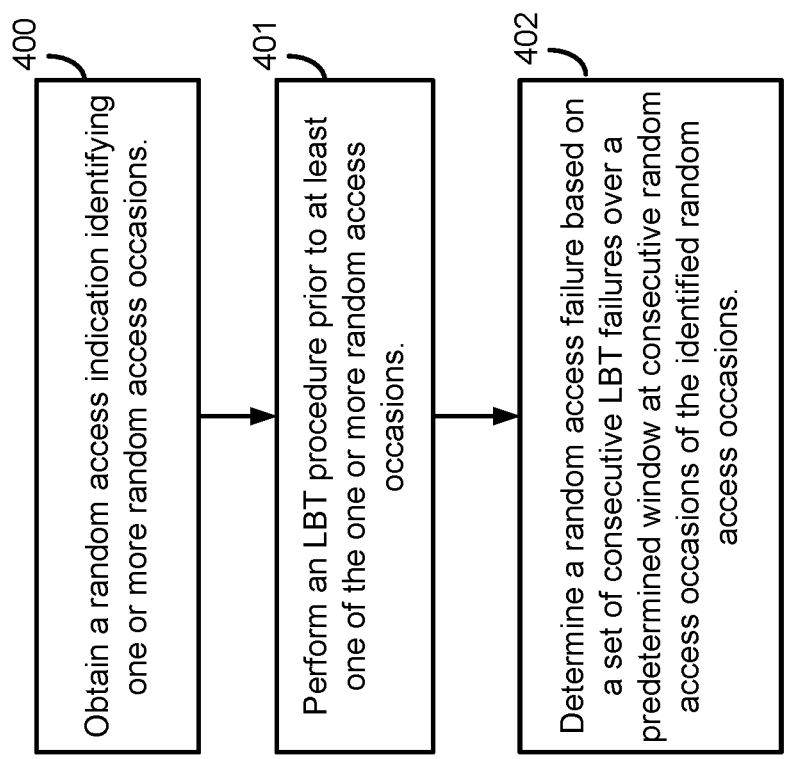
FIG. 4 is a block diagram illustrating example blocks executed to implement one aspect of the present disclosure.
Figure 14:
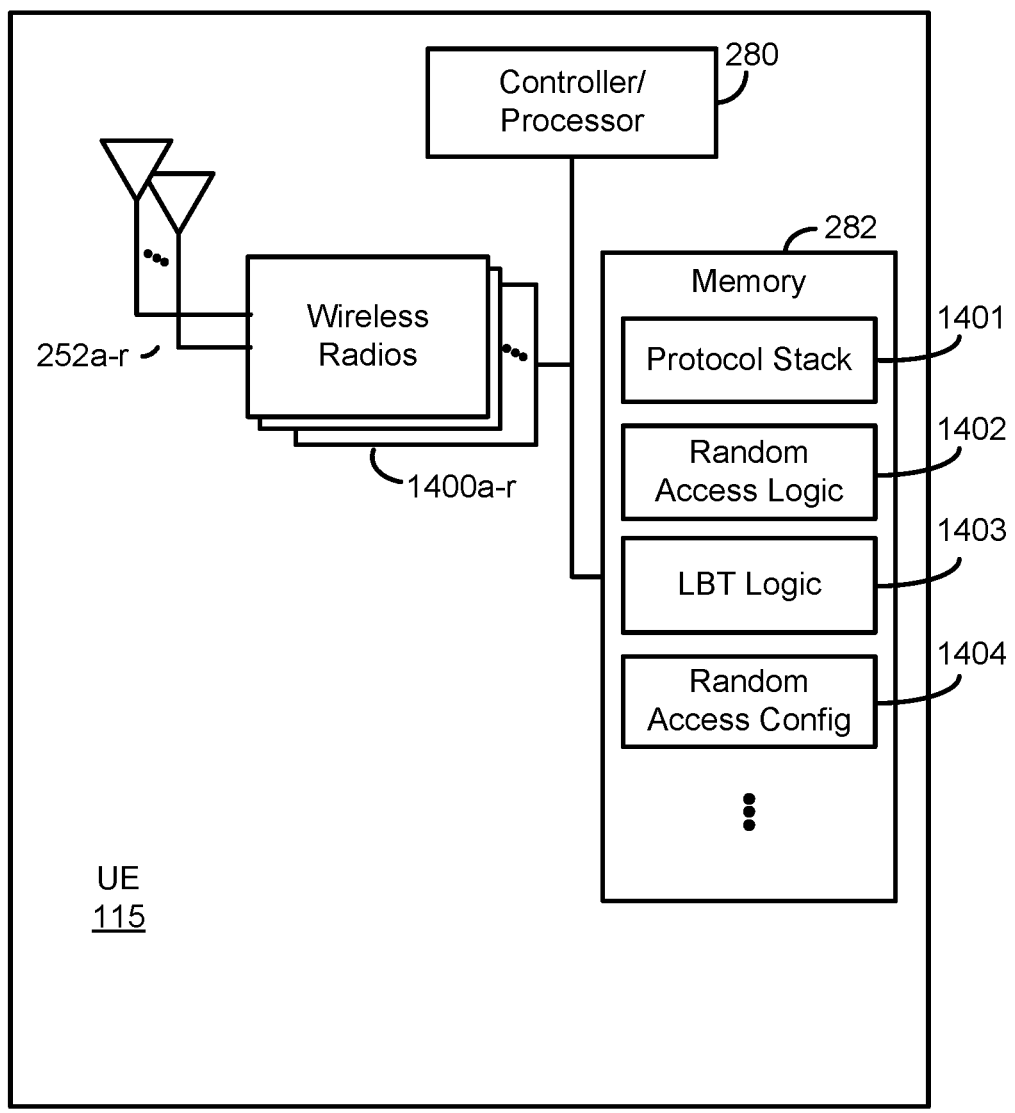
FIG. 14 is a block diagram illustrating an example UE configured according to aspects of the present disclosure.

FIG. 4 is a block diagram illustrating example blocks executed to implement one aspect of the present disclosure. The example blocks will also be described with respect to UE 115 as illustrated in FIG. 14. FIG. 14 is a block diagram illustrating UE 115 configured according to aspects of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1400a-r and antennas 252a-r. Wireless radios 1400a-r includes various components and hardware, as illustrated in FIG. 2 for UE 115, including modulator/demodulators 254a-r, MIMO detector 256, receive processor 258, transmit processor 264, and TX MIMO processor 266.

At block 400, a UE obtains a random access indication identifying one or more random access occasions. The medium access control (MAC) layer of a UE, such as UE 115, is one of the lower level protocol layers of protocol stack 1401, in memory 282. Protocol stack 1401 provides UE 115 with the functionality for communications within the network architecture of an NR-U operation. The MAC layer selects one or more ROs from the total number of ROs configured for UE 115. The total number of ROs may be configured via semi-static signaling, such as radio resource control (RRC) signaling received from a base station via antennas 252a-r and wireless radios 1400 and stored in memory 282 at random access configuration 1404. In current NR-U operations, the MAC layer identifies only a single RO at a time. According to selected aspects of the present disclosure, the MAC layer may identify multiple ROs for UE 115. Other aspects of the present disclosure provide for the MAC layer to identify a single RO.

At block 401, the UE performs an LBT procedure prior to at least one of the one or more random access occasions. In preparation for a random access attempt, UE 115, under control of controller/processor 280, executes random access logic 1402. The execution environment of random access logic 1402 provides the feature and functionalities for the enhanced random access capabilities described in the various aspects of the present disclosure. Within the execution environment of random access logic 1402, in preparation for a random access attempt at a next RO, UE 115, under control of controller/processor 280, executes LBT logic 1403. The execution environment of LBT logic 1403 provides UE 115 the functionality to perform an LBT procedure on the shared frequency band configured for the next RO.

At block 402, the UE determines a random access failure based on a set of consecutive LBT failures over a predetermined window at consecutive random access occasions of the one or more random access occasions. Within the execution environment of random access logic 1402, UE 115 monitors for each consecutive LBT failure at the one or more ROs identified by the MAC layer. In the aspects of the present disclosure where the MAC layer identifies multiple ROs at a time for UE 115, when an LBT failure occurred at each of the consecutive ROs identified, UE 115 will declare a random access failure. In other aspects, where the MAC layer identifies a single RO after each LBT failure, UE 115 will count each LBT failure over a predefined evaluation period. When the number of consecutive LBT failures at ROs over the evaluation period reaches a threshold value, UE 115 will declare a random access failure.

Figure 5:
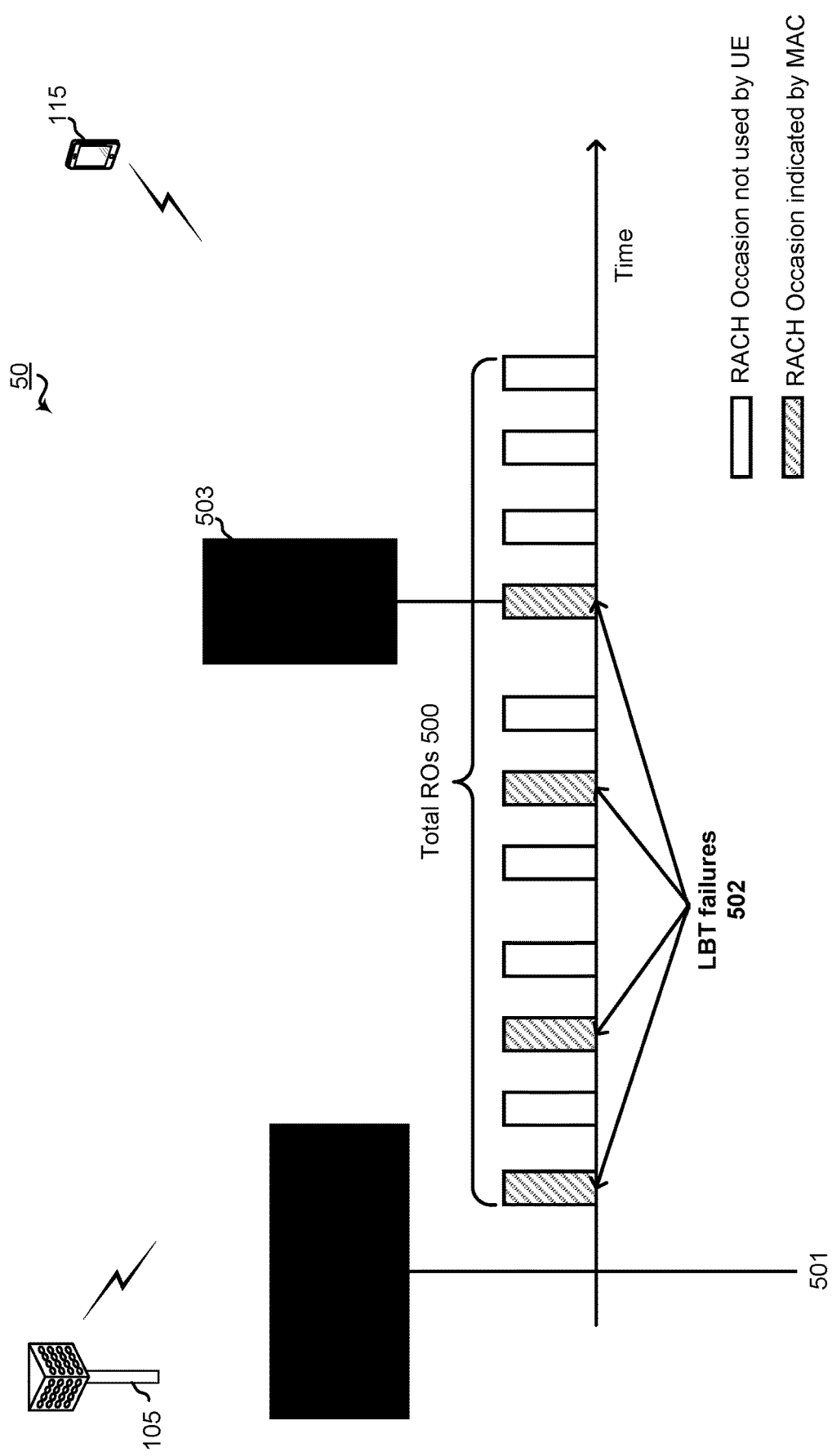
FIG. 5 is a block diagram illustrating a portion of an NR-U network having a base station and UE each configured according to one aspect of the present disclosure.

FIG. 5 is a block diagram illustrating a portion of an NR-U network 50 having a base station 105 and UE 115 each configured according to one aspect of the present disclosure. Base station 105 has signaled a random access configuration to UE 115 that includes configuration of a total number of ROs 500, such as via RRC signaling. According to the illustrated aspect of FIG. 5, at 501, the MAC layer of UE 115 indicates four ROs to UE 115 for random access transmission. Random access failure may be declared only if LBT fails on all the ROs indicated by MAC. The random access configuration may further indicate the maximum number of ROs that can be selected by the MAC layer, which can be expressed in terms of a number of ROs or a time duration for random access attempts.

An RO may be associated to particular synchronization signal block (SSB). Such ROs associated with SSBs may be used by UE 115 for random access transmission when the associated SSB meets transmission criteria, such that the signal strength of the SSB exceeds a minimum signal strength threshold. When determining which of total number of ROs 500 the MAC layer may select, the MAC layer may measure the SSB associated with the RO and select those ROs for which the associated SSB exceeds the threshold. In one alternative aspect of the present disclosure, the MAC layer may select ROs such that the time difference between any two successive time domain ROs is greater than a threshold and the ROs satisfy the above identified transmission criteria. In another alternative aspect of the present disclosure, the MAC layer may select the ROs that satisfy above identified transmission criteria and are consecutive to each other in the time and/or frequency domain. The MAC layer would indicate to the physical layer (PHY) of UE 115 which of the ROs may be used in additional to the random access preamble that should be used for the corresponding RO. The indication of ROs from the MAC layer may be made based on time/frequency resources or the associated SSBs. If the LBT procedure succeeds for an RO, then UE 115 will indicate the successful RO where the random access transmission occurred and discards remaining indicated ROs. However, as illustrated in FIG. 5, each of the four ROs indicated by the MAC layer at 501 experiences LBT failure 502. In response to detecting the LBT failure for each of the indicated ROs, UE 115 declares random access failure at 503.

Figure 6:
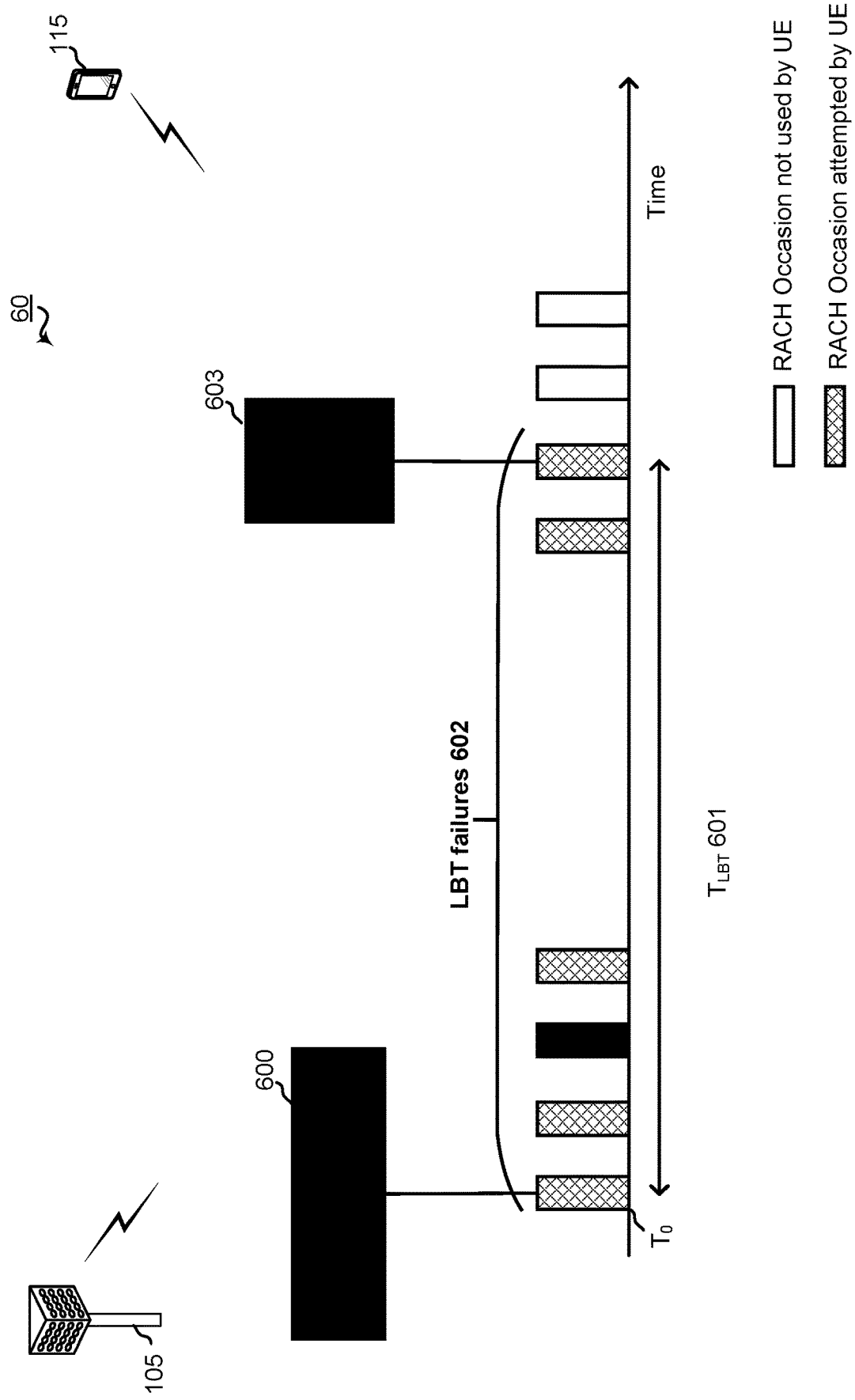
FIG. 6 is a block diagram illustrating a portion of an NR-U network having a base station and UE each configured according to one aspect of the present disclosure.

FIG. 6 is a block diagram illustrating a portion of an NR-U network 60 having a base station 105 and UE 115 each configured according to one aspect of the present disclosure. According to the illustrated aspect of FIG. 6, random access failure may be declared at 603 if LBT failures 602 occur consecutively for an evaluation interval, $T_{LBT}$ 601. This solution assumes the MAC layer of UE 115 reselects random access resources for transmission after each LBT failure. UE 115 begins random access attempts at time $T_0$, either at the start of a random access procedure or after a random access failure is detected. If the LBT procedures fail for all successive random access occasions between $T_0$ and $T_{LBT}$, then UE 115 declares random access failure at 603 due to LBT failure. According to the presently described example aspect, $T_{LBT}$ 601 can be defined in terms of a timer duration (e.g., ms) or in terms of number of LBT failures, X.

In a random access procedure, a UE may receive a preamble backoff value in a random access response (RAR) message. The primary purpose of the preamble backoff value is alleviate random access collisions due to multiple UEs transmitting same preamble. In NR Rel-15, a UE would apply the preamble backoff for every random access retransmission until it receives a valid RAR, upon which the backoff value is reset. However, random access retransmissions upon LBT failure on the UE side should not be delayed unnecessarily. For example, application of the preamble backoff can be avoided which is meant to address congestion on a random access resource. It should be noted that interference in the channel is taken into account by LBT contention window.

Figure 7:
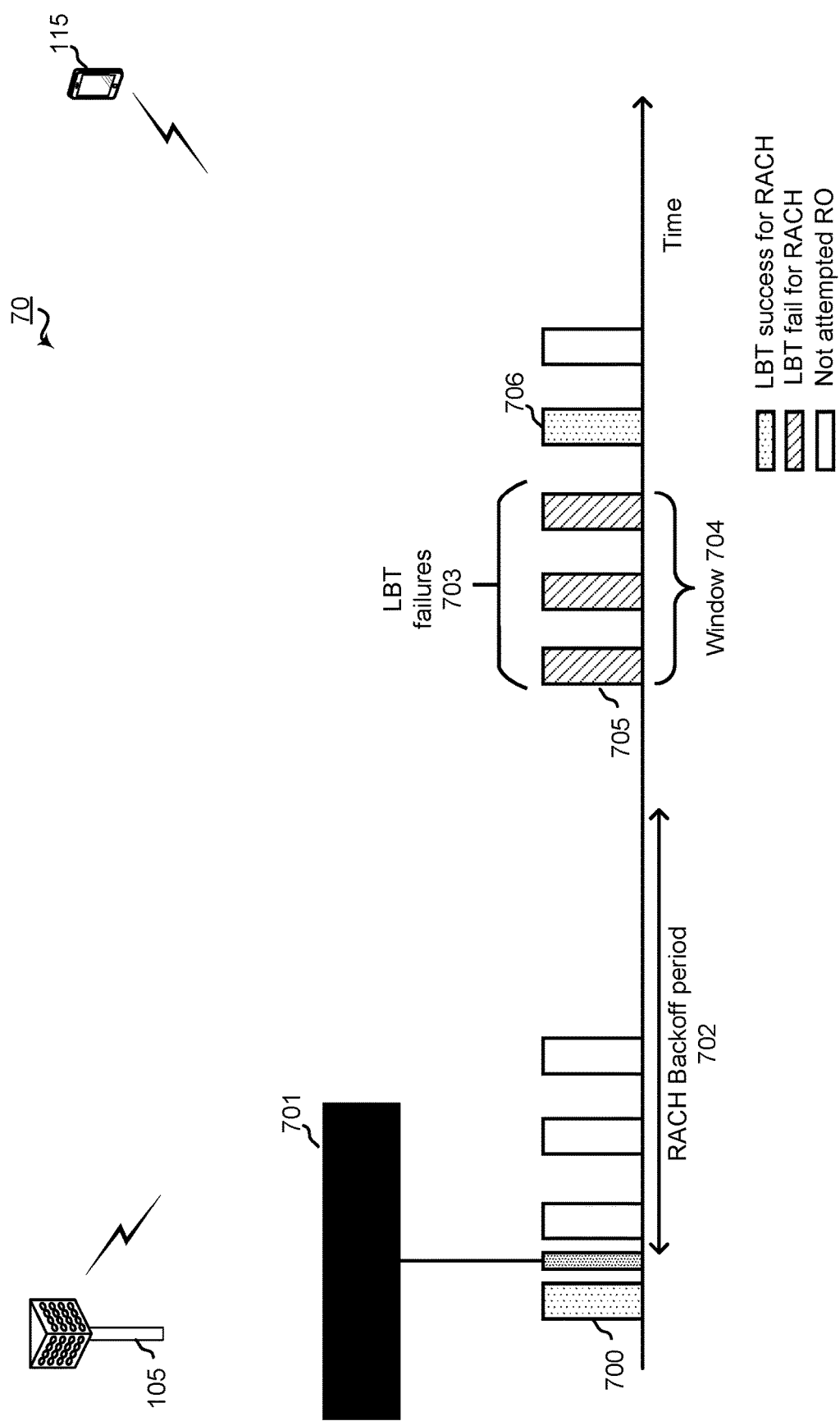
FIG. 7 is a block diagram illustrating a portion of an NR-U network having a base station and UE each configured according to one aspect of the present disclosure.

FIG. 7 is a block diagram illustrating a portion of an NR-U network 70 having a base station 105 and UE 115 each configured according to one aspect of the present disclosure. According to the illustrated aspect of FIG. 7, at 700, UE 115 successfully access an RO to perform a random access transmission, such as a Msg1 transmission. At 701, UE 115 receives a RAR from base station 105 that includes a preamble backoff parameter. Once the preamble backoff parameter is received, UE 115 begins applying the random access backoff period 702, in which UE 115 does not attempt further random access transmissions on configured ROs. At a series of next available consecutive ROs, UE 115 experiences LBT failures 703. However, UE 115 does not apply the preamble backoff parameter for the random access attempts after LBT failures 703 that are within a predetermined window 704. Predetermined window 704 may represent a time, $T_{LBT}$, as described with respect to FIG. 6, or a set of multiple ROs indicated by the MAC layer, as described with respect to FIG. 5.

In a first optional aspect, as further illustrated by FIG. 7, UE 115 may reset the preamble backoff value when LBT failure occurs, such as at 705. By resetting the preamble backoff value, UE 115 would not apply the preamble backoff to any further random access attempt until it receives a valid RAR, such as after successful random access transmission at 706. In a second optional aspect, UE 115 would not apply the preamble backoff value for random access retransmission when LBT failures 703 occur.

Figure 8:
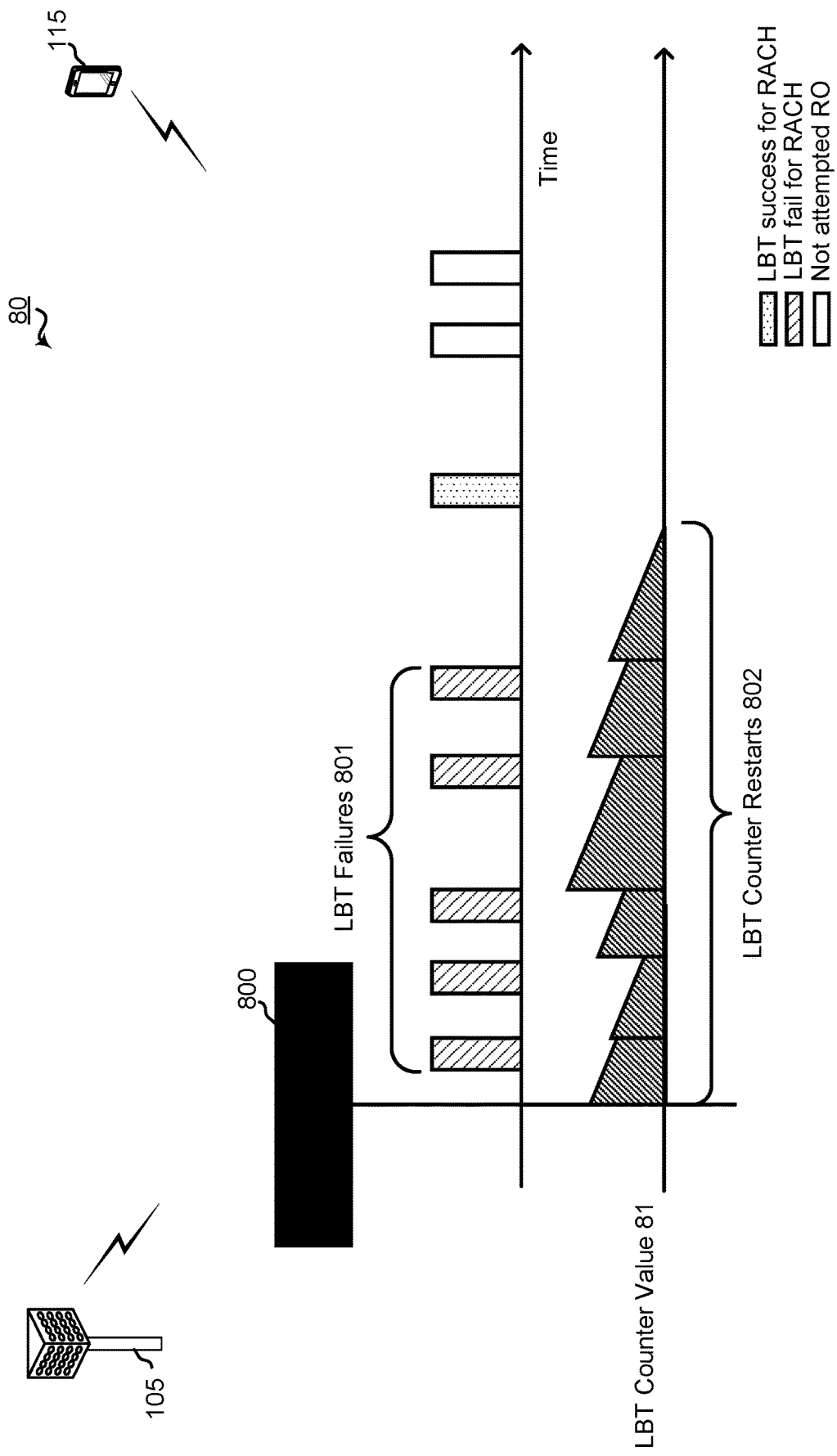
FIG. 8 is a block diagram illustrating a portion of an NR-U network having a base station and UE.

FIG. 8 is a block diagram illustrating a portion of an NR-U network 80 having a base station 105 and UE 115. At 800, UE 115 has a random access procedure triggered. The triggering of the random access procedure starts an LBT counter, as illustrated in LBT counter value line 81. The LBT counter is started with a random value selected by UE 115. UE 115 will continuously decrement the LBT counter if no interference is observed. UE 115 cannot perform any uplink transmission when the LBT counter is greater than 0. LBT failure may occur for a full, Category-4 (Cat-4) LBT procedure due to an LBT counter decrement. When the LBT counter reaches zero or less than zero, UE 115 may perform an additional abbreviated LBT procedure, such as a clear channel assessment (CCA) check for one slot. At each of LBT failures 801, LBT counter restarts 802 occurs. Restarting the LBT counter after each random access LBT failure may lead to UE 115 missing many available ROs. Additional aspects of the present disclosure are directed to modifying the LBT counter principle to prevent undue delay in UE 115 retransmitting random access attempts.

Figure 9:
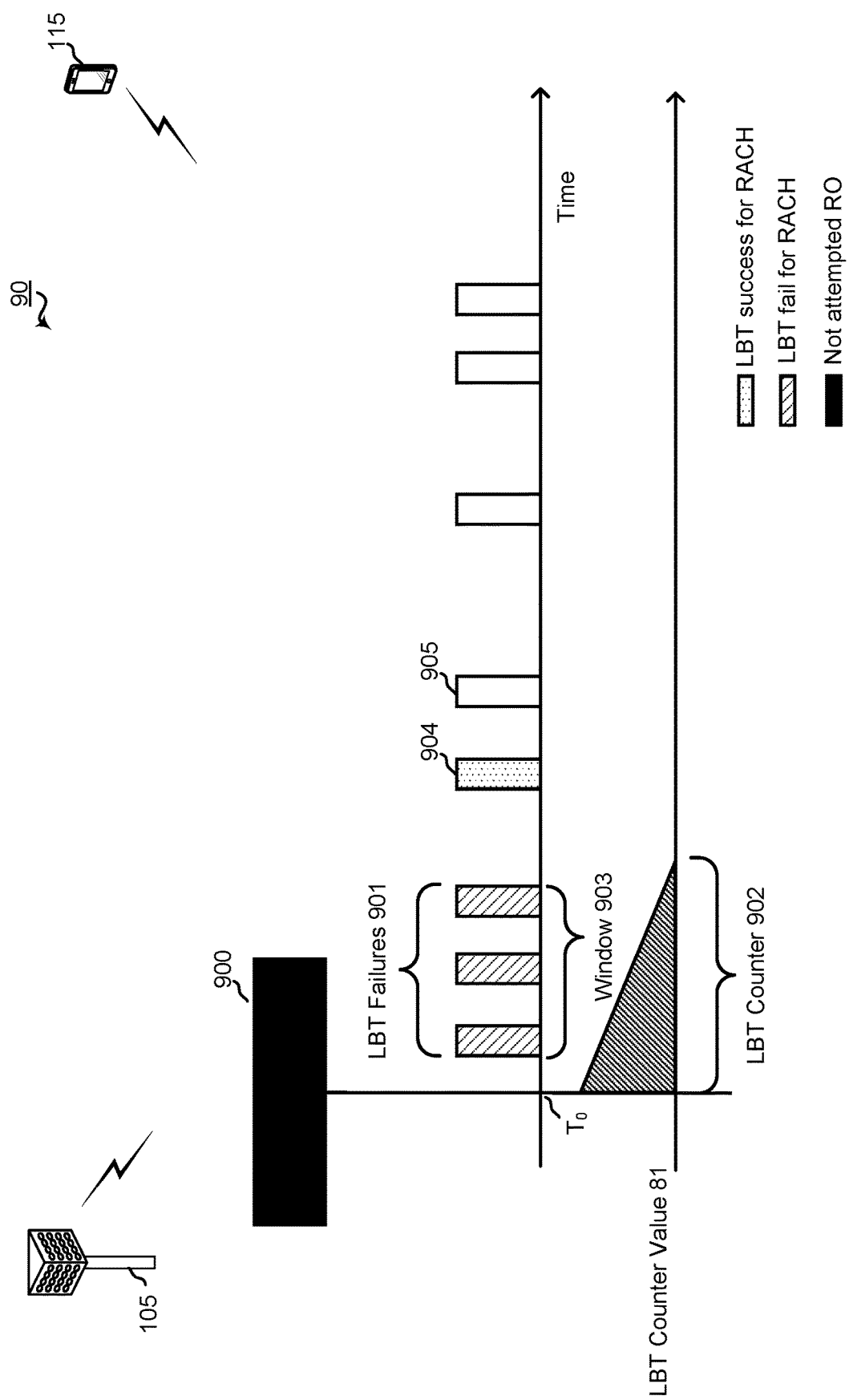
FIG. 9 is a block diagram illustrating a portion of an NR-U network having a base station and UE each configured according to one aspect of the present disclosure.

FIG. 9 is a block diagram illustrating a portion of an NR-U network 80 having a base station 105 and UE 115 each configured according to one aspect of the present disclosure. According to the illustrated aspect of FIG. 9, UE 115 begins the random access procedure at time $T_0$ (at the start of random access procedure or after random access failure is detected). UE 115 initiates counting down LBT counter 902, as illustrated in LBT counter value line 81, before performing the first random access attempt after time $T_0$. UE 115 continues to decrement LBT counter 902 even after LBT failures 901 over a predetermined window 903. As noted with respect to the aspect described for FIG. 7, predetermined window 903 may represent a time, $T_{LBT}$, as described with respect to FIG. 6, or a set of multiple ROs indicated by the MAC layer, as described with respect to FIG. 5. UE 115 would not restart or reset LBT counter value 902 when one of LBT failures 901 occur on a random access attempt, due to a positive value of LBT counter value 902. UE 115 may instead reset LBT counter value 902 when either a random access attempt is successful, such as at 904, a random access failure is triggered due to LBT failures, or an LBT failure occurs when LBT counter value 902 is less than or equal to zero. In such case, UE 115 restarts LBT counter value 902 for next random access transmission 905.

The preamble backoff received in the previous RAR message does not make sense for LBT failures, as it only takes into account congestion on the random access resources. It should be noted that interference in the channel can be taken into account by an LBT contention window. The necessity of applying a backoff after RACH failure is detected comes into question. If one is to be applied, then how does UE 115 determine its value (note that RAR provided backoff may not be optimal).

Figure 10:
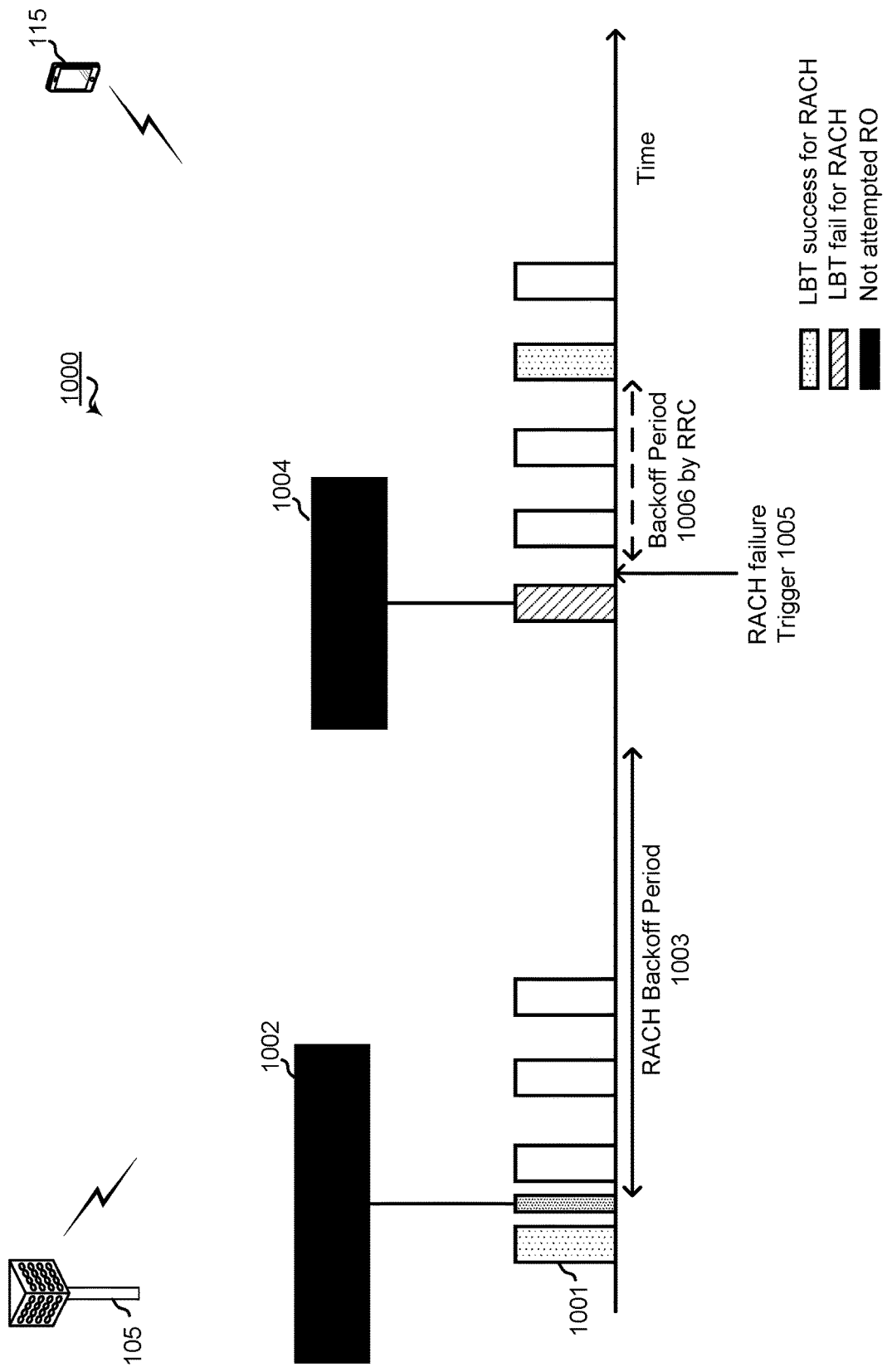
FIG. 10 is a block diagram illustrating a portion of an NR-U network having a base station and UE each configured according to one aspect of the present disclosure.

FIG. 10 is a block diagram illustrating a portion of an NR-U network 1000 having a base station 105 and UE 115 each configured according to one aspect of the present disclosure. According to the illustrated aspect of FIG. 10, after a random access transmission at 1001 is successful, UE 115 receives a RAR at 1002 from base station 105. The RAR at 1002 includes a preamble backoff parameter for UE 115 to apply due to channel congestion. UE 115 applies the random access backoff to the next random access transmission attempt depending on whether the previous random access attempt or Msg3 (e.g., connection request) transmission attempt was successful. Because the random access transmission at 1001 was successful, UE 115 applies random access backoff period 1003 and skips random access transmission attempts on the ROs configured during random access backoff period 1003.

In a first optional example implementation of the illustrated aspect, UE 115 resets the preamble backoff parameter if the random access failure at 1004 occurs due to LBT failure or if UE 115 is not able to transmit Msg3. As noted previously, resetting the preamble backoff parameter causes UE 115 not to apply the backoff to any further random access attempt until it receives a valid RAR message. In a second optional example implementation of the illustrated aspect, UE 115 applies the preamble backoff parameter for random access retransmissions only if the random access attempt or Msg3 transmission was successful. This implies that UE 115 does not apply the backoff parameter when the LBT failure occurs which results in UE 115 not being able to transmit either the random access transmission or Msg3 transmission. In a third optional example implementation, base station 105 may indicate (e.g., RRC configuration, etc.) a backoff period 1006 to be used by UE 115 when the random access failure at 1004 occurs due to LBT failure or if UE 115 is not able to transmit Msg3. The operation of backoff period 1006 may be triggered at 1005 by the random access failure.

Random access resources within an uplink frequency band may overlap with a discovery reference signal (DRS) measurement timing configuration (DMTC) window in a downlink frequency band. Features of NR Rel-15 indicate that random access resources that overlap with SSB transmissions may be considered invalid. NR-U does not have a fixed SSB transmission, rather SSBs can be transmitted flexibly within a fixed DMTC window. For NR-U, because the DMTC window is long and SSB occasions are opportunistic, aspects of the present disclosure provide for a refinement of random access occasion validity rules.

Figure 11A:
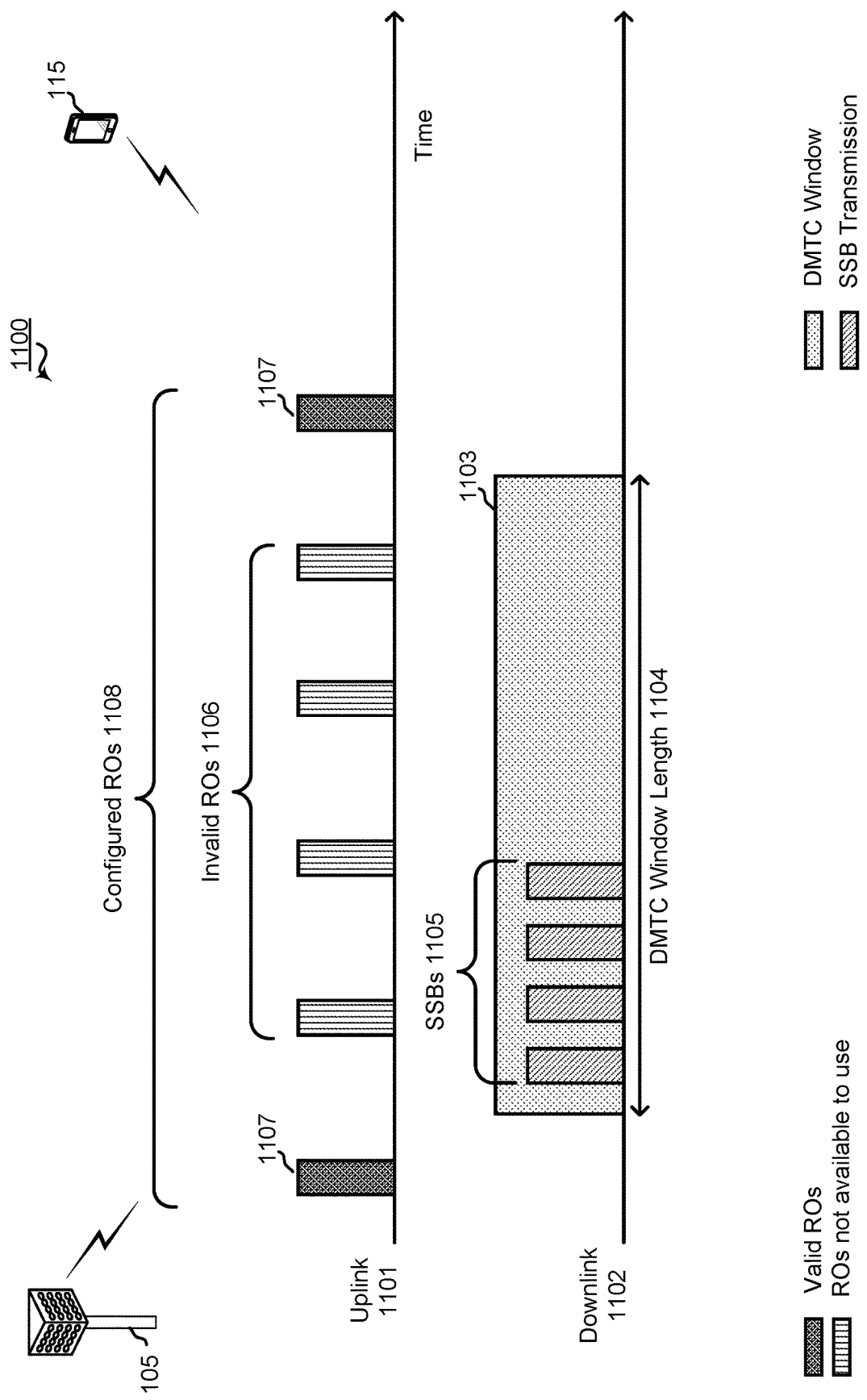
FIGS. 11A-11C are block diagrams illustrating a portion of an NR-U network having a base station and UE each configured according to aspects of the present disclosure.

FIG. 11A is a block diagram illustrating a portion of an NR-U network 1100 having a base station 105 and UE 115 each configured according to one aspect of the present disclosure. According to the illustrated aspect of FIG. 11A, base station 105 signals a random access configuration that identifies a set of ROs 1108 on uplink band 1101 for UE 115. The set of ROs 1108 on uplink band 1101 overlaps a DMTC window 1103 of DMTC window length 1104 on downlink band 1102. Base station 105 may opportunistically transmit SSBs 1105 within DMTC window 1103. UE 115 may determine the validity of each of the set of ROs 1108 based on the occurrence of DMTC window 1103. According to a first optional aspect illustrated in FIG. 11A, the default behavior for UE 115 may declare each of ROs 1108 that overlap with DMTC window 1103 invalid. Thus, valid ROs 1107 of ROs 1108 are determined to be valid ROs accessible to UE 115 and invalid ROs 1106 of ROs 1108 are determined to be invalid ROs that are not accessible to UE 115. Random access resource validity of ROs 1108 may be decided based on the occurrence of DMTC window 1103. For invalid ROs 1106, UE 115 may perform SSB-to-RO mapping, but cannot use invalid ROs 1106 for random access transmission.

Figure 11B:
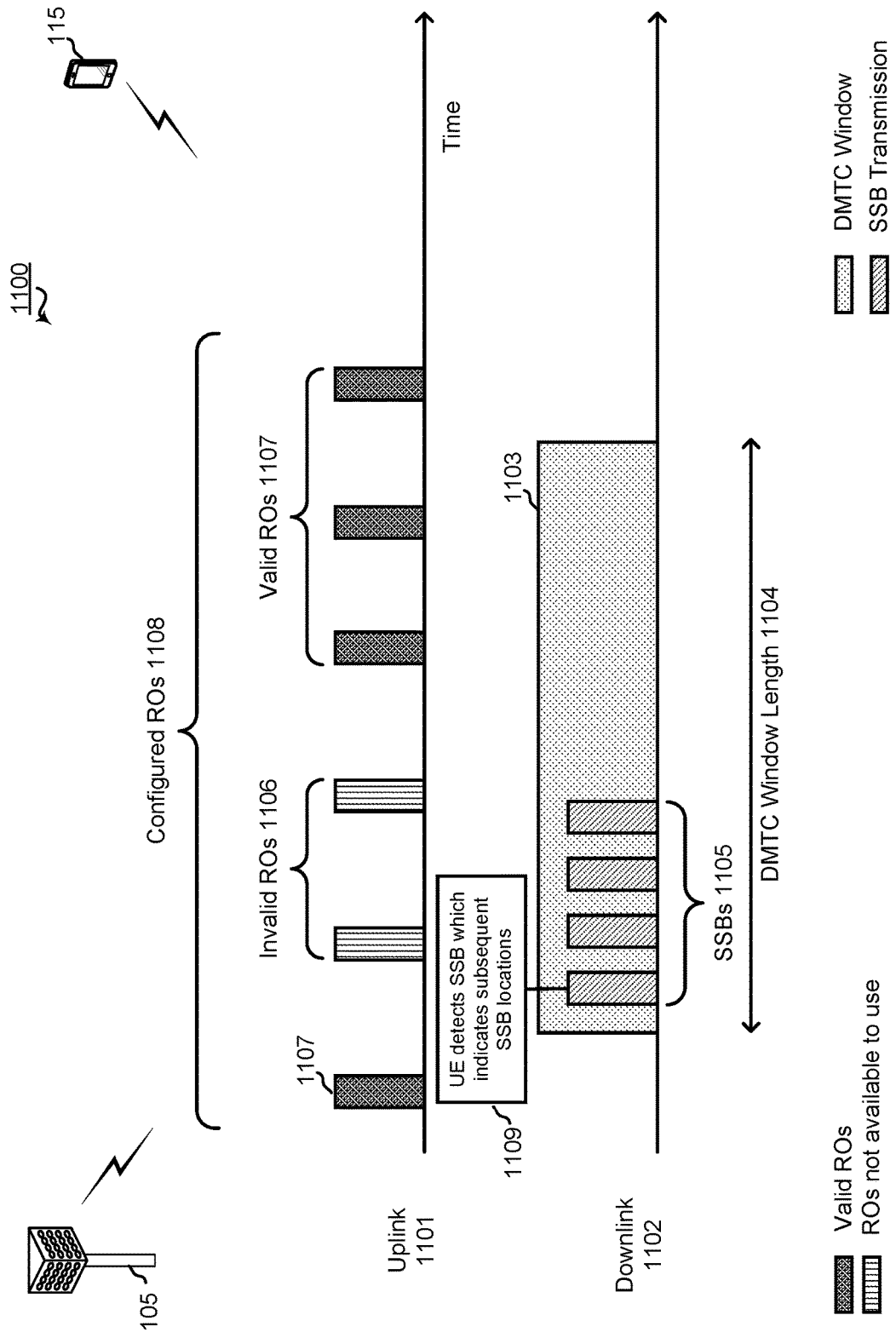

FIG. 11B is a block diagram illustrating a portion of NR-U network 1100 having a base station 105 and UE 115 each configured according to an additional aspect of the present disclosure. According to the illustrated example aspect of FIG. 11B, UE 115 may also make the determination of validity of ROs 1108 on uplink band 1101 based on the occurrence of DMTC window 1103 on downlink band 1102. UE 115 detects SSB 1109 or the remaining minimum system information (RMSI) message which identifies the remaining locations of SSBs 1105 within DMTC window 1103. By using the information that identifies the locations of transmissions within DMTC window 1103, UE 115 may determine the portion of DMTC window 1103 that is not being used by base station 105 for transmission. Thus, UE 115 may declare any ROs invalid that overlap with the known transmissions of SSBs 1105 and those ROs valid that either do not overlap DMTC window 1103 or overlap the unused portions of DMTC window 1103. Accordingly, UE 115 determines valid ROs 1107 and invalid ROs 1106. A network indication from base station 105 can be transmitted (e.g., using a group common (GC)-PDCCH) which indicates information with regard to the transmission status of SSBs 1105 or RMSI within DMTC window 1103. As noted above, the transmission of SSB 1109 can also indicate to UE 115 (e.g., PBCH payload may indicate SSB transmission number) which SSB occasions will not be used within DMTC window 1103.

Figure 11C:
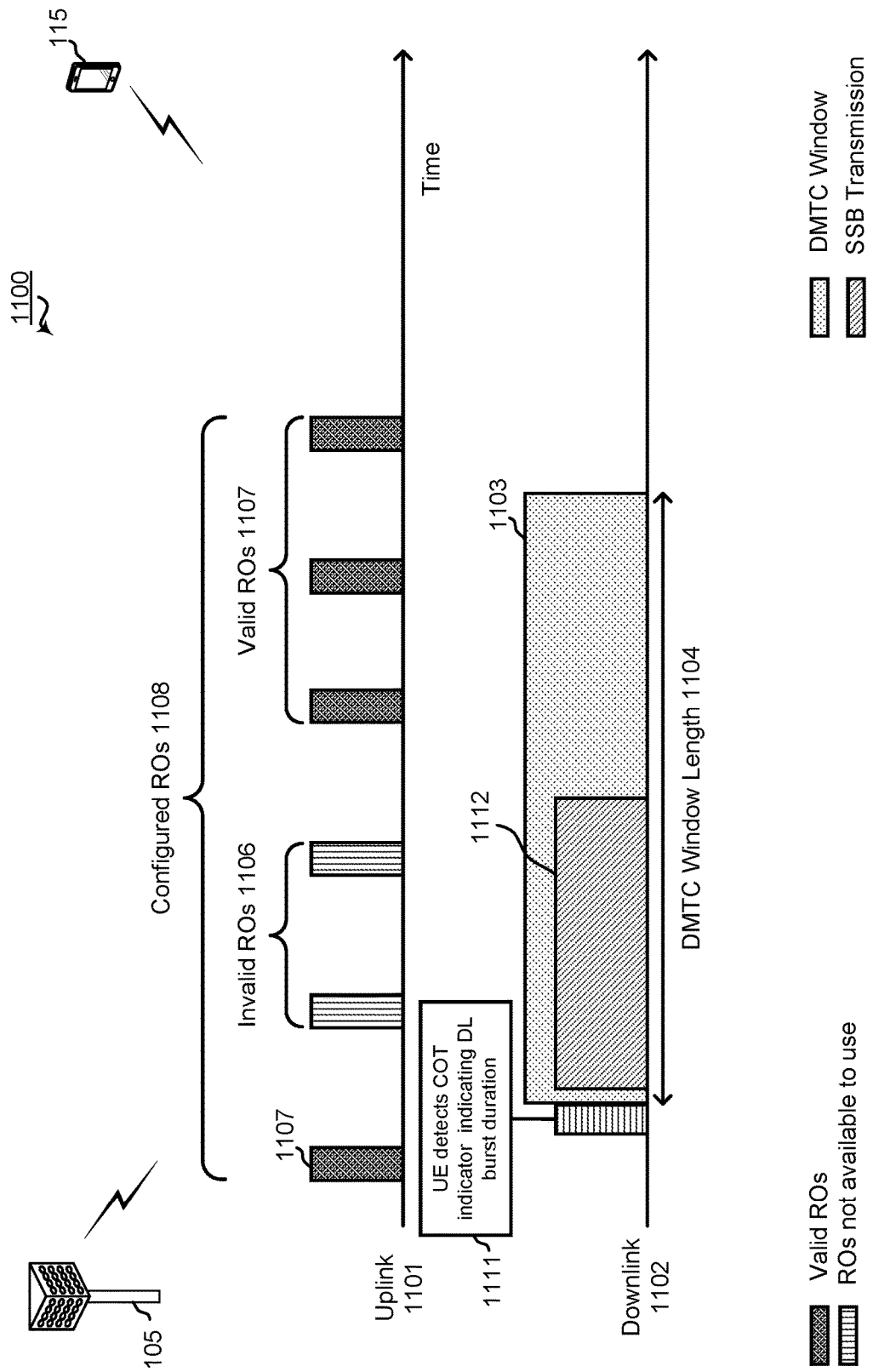

FIG. 11C is a block diagram illustrating a portion of NR-U network 1100 having a base station 105 and UE 115 each configured according to an additional aspect of the present disclosure. According to the illustrated aspect of FIG. 11C, the validity of ROs 1108 is again determined by UE 115 based on the occurrence of DMTC window 1103 over DMTC window length 1104. ROs 1108 on uplink band 1101 overlap with DMTC window 1103 on downlink band 1102. In one optional example implementation according to the illustrated aspect, UE 115 receives a COT structure indication 1111 from base station 105. COT structure indication 1111 provides UE 115 information regarding the transmission structure 1112 of DMTC window 1103. The transmission structure 1112 may identify the downlink bursts or network acquired COT within DMTC window 1103. UE 115 may then declare those ROs of ROs 1108 that overlap with transmission structure 1112 invalid ROs 1106 and the non-overlapping ROs valid ROs 1107. If UE 115 attempts to perform random access during DMTC window 1103, then UE 115 may monitor for COT structure indication 1111 from base station 105 indicating whether ROs 1108 are valid for usage or not.

Additional ROs may be dynamically triggered via downlink control information (DCI) signals within a network-acquired COT. The dynamically triggered ROs are in additional to the semi-statically configured ROs. In certain instances, dynamically triggered ROs may overlap with the semi-statically configured ROs. When both dynamically-triggered and semi-statically triggered ROs are configured over the same transmission opportunity, it is unclear which configured ROs may be used by UE 115 for random access transmissions.

Figure 12:
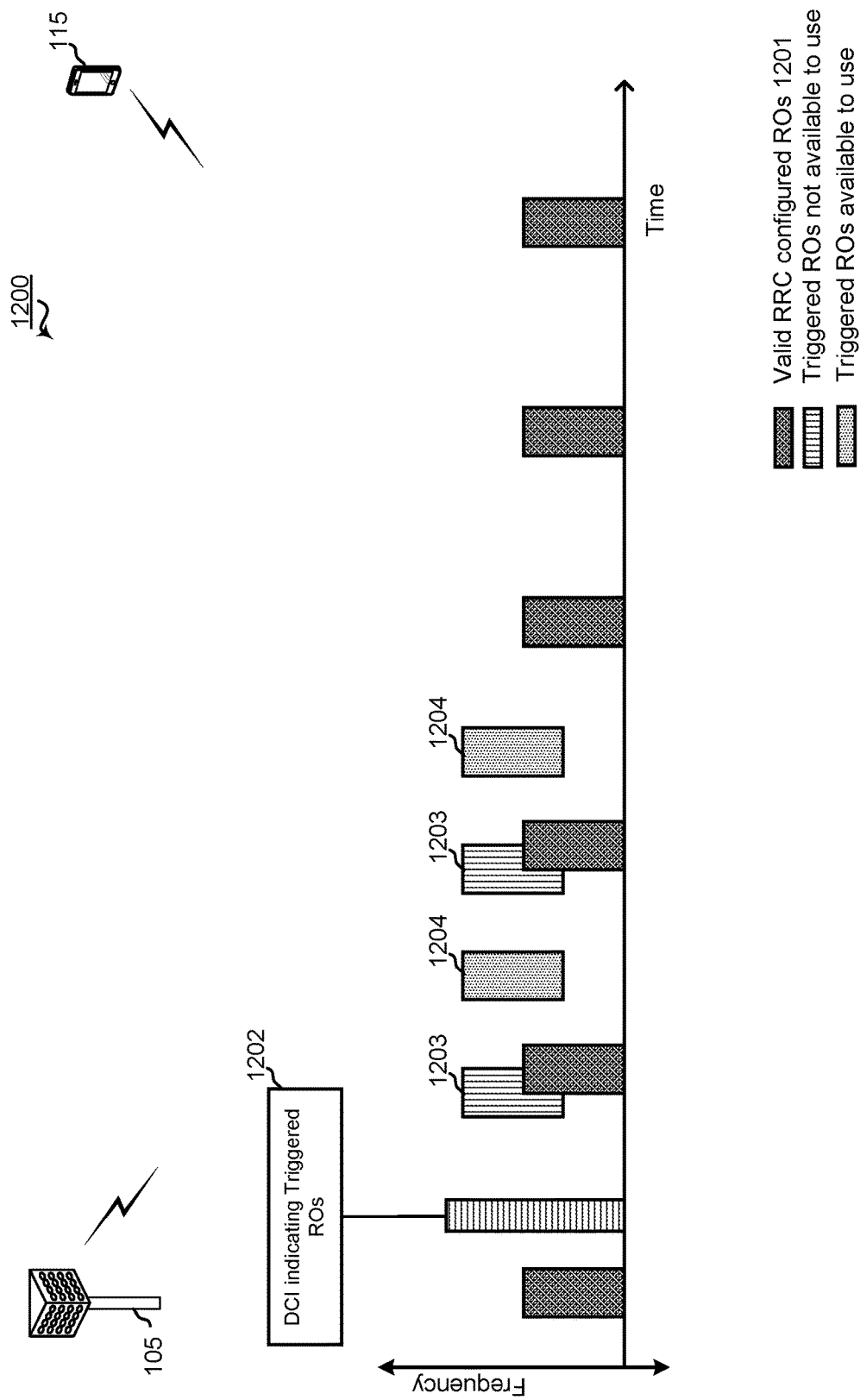
FIG. 12 is a block diagram illustrating a portion of an NR-U network having a base station and UE each configured according to one aspect of the present disclosure.

FIG. 12 is a block diagram illustrating a portion of an NR-U network 1200 having a base station 105 and UE 115 each configured according to one aspect of the present disclosure. According to the illustrated aspect of FIG. 12, base station 105 provides a random access configuration that semi-statically configures semi-statically configured ROs 1201. At 1202, however, UE 115 receives a DCI from base station 105 that dynamically configures additional ROs 1203 and 1204. However, additional ROs 1203 overlap semi-statically configured ROs 1201 in both time and frequency. UE 115 cannot use additional ROs 1203 which are partially or fully overlapping in time and/or frequency with semi-statically configured ROs 1201. UE 115 would also not perform SSB-to-RO mapping for additional ROs 1203 which are not used.

Dynamically triggered ROs that overlap in time only with semi-statically configured ROs, additional ROs 1204, may potentially be used by UE 115. Thus, according to the illustrated aspect, UE 115 may not use additional ROs 1203, but may use additional ROs 1204 for random access transmissions. It should be noted that dynamically-triggered ROs, such as additional ROs 1204 may have higher chance of success (e.g., may use higher priority LBT class) than the semi-statically configured ROs 1201. Accordingly, UE 115 may have a preference to use such additional ROs 1204 when available.

Figure 13:
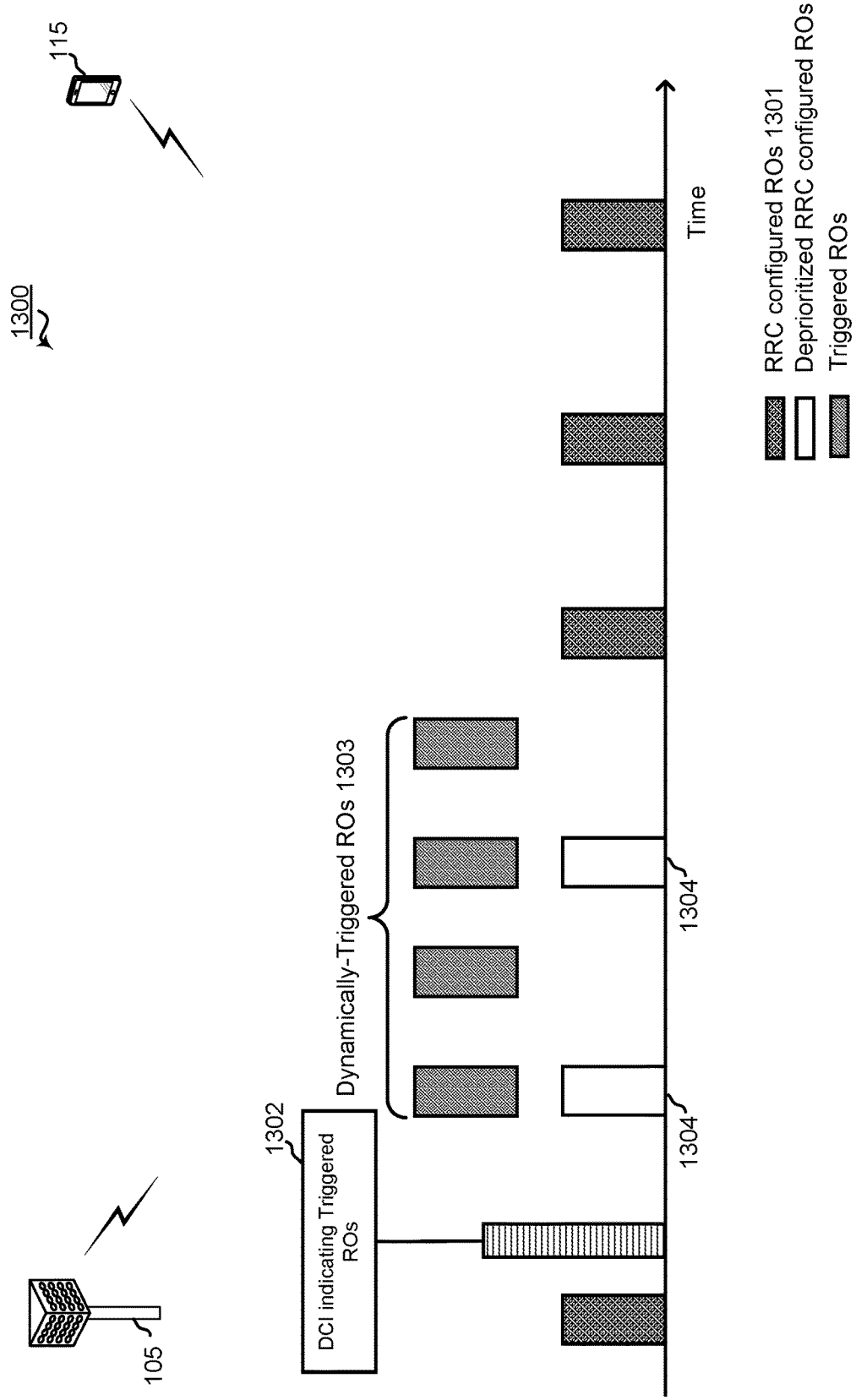
FIG. 13 is a block diagram illustrating a portion of an NR-U network having a base station and UE each configured according to one aspect of the present disclosure.

FIG. 13 is a block diagram illustrating a portion of an NR-U network 1300 having a base station 105 and UE 115 each configured according to one aspect of the present disclosure. According to the illustrated aspect of FIG. 13, base station 105 provides semi-static random access configuration of semi-statically configured ROs 1301. At 1302, base station 105 transmits a DCI signal dynamically triggering dynamically-triggered ROs 1303. Dynamically-triggered ROs 1303 overlap some of semi-statically configured ROs 1301 but only in time. UE 115 may prioritize random access transmission on such dynamically-triggered ROs 1303 that overlap semi-statically configured ROs 1301 that overlap in time but not frequency. UE 115 may deprioritize semi-statically configured ROs 1304 that overlap with the dynamically-triggered ROs 1303. If the LBT procedure succeeds on both dynamically-triggered ROs 1303 and semi-statically configured ROs 1301, then UE 115 will perform random access transmissions on dynamically-triggered ROs 1303 and not semi-statically configured ROs 1304 (assuming that UE 115 can perform transmission on either of resources based random access resource selection).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
    receiving a random access configuration message identifying a plurality of configured random access occasions configured over a shared communication spectrum and identifying a number of random access occasions;
    measuring a signal strength of at least one synchronization signal block (SSB) detected on the shared communication spectrum, wherein the at least one SSB is associated with a random access occasion of the plurality of configured random access occasions;
    selecting the random access occasion associated with the at least one SSB in accordance with the signal strength of the at least one SSB being greater than a threshold signal strength, wherein the plurality of configured random access occasions are less than or equal to the number of random access occasions;
    performing one or more listen before talk (LBT) procedures prior to at least the random access occasion;
    initiating an LBT counter for a first LBT procedure of the one or more LBT procedures for a first random access transmission attempt on the random access occasion;
    updating a value of the LBT counter in response to detection of a failure of an LBT procedure associated with the random access occasion, wherein the value of the LBT counter is maintained until a counter reset event;
    determining a consistent LBT failure based on the value of the LBT counter; and
    communicating the consistent LBT failure to a network node.

2. The method of claim 1, wherein:
    receiving the random access configuration message includes obtaining an indication of the plurality of configured random access occasions from a medium access control (MAC) layer of the UE; and
    updating the LBT counter includes decrementing the LBT counter.

3. The method of claim 1, wherein the random access configuration message includes identification of a random access preamble for use associated with a corresponding random access occasion of the plurality of configured random access occasions.

4. The method of claim 1, further including:
    indicating, at a physical (PHY) layer, a successful random access occasion of the plurality of configured random access occasions in response to success of the LBT procedure corresponding to the successful random access occasion; and
    discarding each remaining random access occasion of the plurality of configured random access occasions after the successful random access occasion.

5. The method of claim 1, wherein determining the consistent LBT failure is based on a comparison of the value of the LBT counter with a predetermined number of LBT failures.

6. The method of claim 1, further including:
    receiving a preamble backoff value within a previous random access response received during a previous random access transmission;
    detecting a failure of the LBT procedure; and
    refraining from applying the preamble backoff value for one or more next random access transmission attempts.

7. The method of claim 6, wherein refraining from applying the preamble backoff value includes:
    resetting the preamble backoff value until a next successfully received random access response, or
    performing a next random access transmission attempt at the one or more next random access transmission attempts without application of the preamble backoff value.

8. The method of claim 1, wherein the counter reset event includes:
    a successful random access transmission;
    determination of a failure in the LBT procedure based on a plurality of LBT failures; or the value of the LBT counter reaching a threshold value upon an LBT failure.

9. The method of claim 1, further including:
    receiving a preamble backoff value within a previous random access response received during a previous random access transmission;
    determining a failure of a random access type transmission at a previous random access opportunity, wherein the failure of the random access type transmission includes:
        a determination of the failure in a random access procedure based on a plurality of LBT failures, or
        a transmission failure of a random access connection request; and
    modifying application of the preamble backoff value to a next random access attempt in response to determination of the failure of the random access type transmission, wherein modifying includes:
        resetting the preamble backoff value until a next successfully received random access response, or applying a random access type transmission failure preamble backoff value associated with the failure of the random access type transmission.

10. The method of claim 9, further including:
determining a success of the random access type transmission at the previous random access opportunity, wherein the success of the random access type transmission includes:
a determination of a successful random access transmission attempt, or
a transmission success of the random access connection request from; and
applying the preamble backoff value to the next random access attempt in response to determination of the success of the random access type transmission.

11. The method of claim 1, further including:
detecting that one of more overlapping random access occasions of the plurality of configured random access occasions overlap a discovery reference signal (DRS) measurement timing configuration (DMTC) window configured for downlink resources; and
determining a validity of each of the one or more overlapping random access occasions, wherein performing the LBT procedure is only performed prior to a valid random access occasion of the at least one of the plurality of configured random access occasions.

12. The method of claim 1, further including declaring as valid at least one random access occasion of the plurality of configured random access occasions based on timing of the at least one random access occasion relative to a synchronization signal block (SSB).

13. The method of claim 1, wherein the LBT procedure is associated with a communication spectrum, and wherein the communication spectrum is associated with multiple wireless communication protocols.

14. An apparatus configured for wireless communication, the apparatus comprising:
at least one processor; and
a memory coupled to the at least one processor, wherein the at least one processor is configured to:
receive a random access configuration message identifying a plurality of configured random access occasions configured over a shared communication spectrum and identifying a number of random access occasions;
measure a signal strength of at least one synchronization signal block (SSB) detected on the shared communication spectrum, wherein the at least one SSB is associated with a random access occasion of the plurality of configured random access occasions;
select the random access occasion associated with the at least one SSB in accordance with the signal strength of the at least one SSB being greater than a threshold signal strength, wherein the plurality of configured random access occasions are less than or equal to the number of random access occasions;
perform one or more listen before talk (LBT) procedures prior to the random access occasion;
initiate an LBT counter for a first LBT procedure of the one or more LBT procedures for a first random access transmission attempt on the random access occasion;
update a value of the LBT counter in response to detection of a failure of an LBT procedure associated with the random access occasion, wherein the value of the LBT counter is maintained until a counter reset event;

determine a consistent LBT failure based on the value of the LBT counter; and
communicate the consistent LBT failure to a network node.

15. The apparatus of claim 14, wherein the random access configuration message includes identification of a random access preamble for use associated with a corresponding random access occasion of the plurality of configured random access occasions.

16. The apparatus of claim 14, wherein the at least one processor is further configured to:
indicate, at a physical (PHY) layer, a successful random access occasion of the plurality of configured random access occasions in response to success of the LBT procedure corresponding to the successful random access occasion; and
discard each remaining random access occasion of the plurality of configured random access occasions after the successful random access occasion.

17. The apparatus of claim 14, wherein the at least one processor is further configured to determine the consistent LBT failure based on a comparison of the value of the LBT counter with a predetermined number of LBT failures.

18. The apparatus of claim 14, wherein:
the at least one processor is further configured to:
receive a preamble backoff value within a previous random access response received during a previous random access transmission;
detect a failure of the LBT procedure; and
refrain from applying the preamble backoff value for one or more next random access transmission attempts, and
to refrain from applying the preamble backoff value, the at least one processor further configured to:
reset the preamble backoff value until a next successfully received random access response, or
perform next random access transmission attempts at the one or more next random access transmission attempts without application of the preamble backoff value.

19. The apparatus of claim 14, wherein the counter reset event includes:
a successful random access transmission;
determination of a failure in the LBT procedure based on a plurality of LBT failures; or
the value of the LBT counter reaching a threshold value upon an LBT failure.

20. The apparatus of claim 14, wherein the at least one processor is further configured to:
receive a preamble backoff value within a previous random access response received during a previous random access transmission;
determine a failure of a random access type transmission at a previous random access opportunity, wherein the failure of the random access type transmission includes:
a determination of the failure in a random access procedure based on a plurality of LBT failures, or
a transmission failure of a random access connection request from the apparatus; and
modify application of the preamble backoff value to a next random access attempt in response to determination of the failure of the random access type transmission,
to modify the application of the preamble backoff value, the at least one processor configured to:
reset the preamble backoff value until a next successfully received random access response, or apply a random access type transmission failure preamble backoff value received by the apparatus associated with the failure of the random access type transmission.

21. The apparatus of claim 20, wherein the at least one processor is further configured to:
    determine a success of the random access type transmission at the previous random access opportunity, wherein the success of the random access type transmission includes: a determination of a successful random access transmission attempt, or a transmission success of the random access connection request from the apparatus; and
    apply the preamble backoff value to the next random access attempt in response to determination of the success of the random access type transmission.

22. The apparatus of claim 14, wherein the at least one processor is further configured to:
    detect that one of more overlapping random access occasions of the plurality of configured random access occasions overlap a discovery reference signal (DRS) measurement timing configuration (DMTC) window configured for downlink resources associated for the apparatus; and
    determine a validity of each of the one or more overlapping random access occasions, wherein performing the LBT procedure is only performed prior to a valid random access occasion of the at least one of the plurality of configured random access occasions.

23. The apparatus of claim 14, wherein:
    the at least one processor is further configured to declare as valid at least one random access occasion of the plurality of configured random access occasions based on timing of the at least one random access occasion relative to a synchronization signal block (SSB); and
    the apparatus includes a user equipment (UE) that includes the memory and the at least one processor.

24. The apparatus of claim 14, wherein the LBT procedure is associated with a communication spectrum, and wherein the communication spectrum is associated with multiple wireless communication protocols.

\* \* \* \* \*